(12) United States Patent
Seeger

(10) Patent No.: US 11,673,441 B2
(45) Date of Patent: Jun. 13, 2023

(54) SYSTEM AND METHOD FOR RECHARGING A RAILCAR AIR-BRAKE SYSTEM

(71) Applicant: Brown Industries, LLC, Lawrence, KS (US)

(72) Inventor: Stuart Seeger, Parkville, MO (US)

(73) Assignee: BROWN INDUSTRIES, LLC, Lawrence, KS (US)

( * ) Notice: Subject to any disclaimer, the term of this patent is extended or adjusted under 35 U.S.C. 154(b) by 493 days.

(21) Appl. No.: 16/812,113

(22) Filed: Mar. 6, 2020

(65) Prior Publication Data

US 2020/0282782 A1 Sep. 10, 2020

Related U.S. Application Data

(60) Provisional application No. 62/814,951, filed on Mar. 7, 2019, provisional application No. 62/916,409, filed on Oct. 17, 2019.

(51) Int. Cl.
*B60F 1/04* (2006.01)
*B60T 17/02* (2006.01)
*B62D 65/02* (2006.01)
*B60T 13/26* (2006.01)

(52) U.S. Cl.
CPC .............. *B60F 1/043* (2013.01); *B60T 13/26* (2013.01); *B60T 17/02* (2013.01); *B62D 65/02* (2013.01)

(58) Field of Classification Search
CPC .......... B60F 1/043; B60T 13/26; B60T 17/02; B62D 65/02
See application file for complete search history.

(56) References Cited

U.S. PATENT DOCUMENTS

| 2007/0188013 | A1* | 8/2007 | Hoffman | B60T 17/02 303/10 |
| 2013/0341934 | A1* | 12/2013 | Kawanishi | F03D 9/007 290/55 |
| 2019/0070918 | A1* | 3/2019 | Lang | B60F 1/005 |
| 2020/0095926 | A1* | 3/2020 | Sondur | B61C 17/06 |
| 2020/0282782 | A1* | 9/2020 | Seeger | B60T 13/26 |

FOREIGN PATENT DOCUMENTS

| CN | 105189180 A | * | 12/2015 | ......... B60H 1/00642 |
| CN | 106494166 B | * | 8/2019 | .............. B60F 1/043 |
| JP | 4544545 B1 | * | 9/2010 | |

OTHER PUBLICATIONS https://www.brandt.ca/ContentItems/Brochures/R4/R4-PowerUnit-Brochure-pdf.aspx, 8 pages. Accessed Jan. 9, 2023.
https://www.brandt.ca/Divisions/Road-Rail/Products/Hi-Rail-Equipment/Power-Unit/R4-Railcar-Mover, 3 pages. Accessed Jan. 9, 2023.

* cited by examiner

*Primary Examiner* — Vishal R Sahni
(74) *Attorney, Agent, or Firm* — Husch Blackwell LLP

(57) ABSTRACT

A system for recharging a railcar air-brake system for a road-rail vehicle, including a rail-capable material handler, adapted or modified for transporting an at least one railcar that permits an air compression system to provide a near-constant low-volume airflow to recharge the respective air-brake systems without requiring the road-rail vehicle to be driven. The system can generally comprise a hydraulic pump, an air compressor, and at least one railcar air-brake system. The system can be adapted for recharging railcar air-brake systems for a road-rail vehicle adapted for transporting at least two railcars that does not significantly diminish the utility of the road-rail vehicle.

26 Claims, 14 Drawing Sheets

SYSTEM AND METHOD FOR RECHARGING A RAILCAR AIR-BRAKE SYSTEM

CROSS-REFERENCE TO RELATED APPLICATIONS

This application claims priority to U.S. Provisional Patent Application No. 62/814,951, filed Mar. 7, 2019, to Stuart Seeger, entitled "System and Method for Recharging a Railcar Air-Brake System," the entire disclosure of which, including the specification and drawings, is incorporated herein by reference. This application also claims priority to U.S. Provisional Patent Application No. 62/916,409, filed Oct. 17, 2019, to Stuart Seeger, entitled "System and Method for Recharging a Railcar Air-Brake System, the entire disclosure of which, including the specification and drawings, is also incorporated herein by reference.

FIELD OF INVENTION

The present invention relates generally to railroad equipment and, more particularly, to a system for recharging railcar air-brake systems. The present invention is specifically directed to a system for recharging railcar air-brake systems for a rail-capable or road-rail vehicle adapted or modified for transporting at least one railcar.

BACKGROUND OF INVENTION

The survey, design, construction, maintenance, repair, and removal of railroad track systems, including the rails, railroad ties, ballast cushion, sub-ballast, subgrade, and subsoil thereof, require the movement of materials, including debris and rubbish, and equipment to and from the location of a particular job site or segment of railroad track. In some cases, the location of the job site may be isolated from traditional transportation infrastructure, such as conventional road systems and the like, or otherwise located in geographically remote areas, such that the transportation of the necessary materials and equipment is particularly burdensome. For example, job sites can be located in difficult or treacherous terrain and many miles from the nearest town from which a railroad system-related operation is based. Further, in most of these cases, when the party responsible for the railroad track system employs contractors to perform the necessary tasks relative to the railroad track system, it typically provides some or all of the necessary materials and equipment, sometimes in or on railcars, at the nearest city, which, as explained above, could be many miles from the job site. Nonetheless, it is typically the responsibility of the contractors to transport such materials, equipment, and any provided railcars to and from the job site. In many cases, the most effective and feasible option for transporting the materials is by railcars coupled to rail-capable vehicles, such as grapple trucks, designed to utilize or capable of traversing existing rail tracks.

Rail-capable vehicles suitable for transporting such materials, equipment, and any provided railcars can include train engines, locomotives, road-rail vehicles, and others. In general, road-rail vehicles are capable of operating on both conventional road systems and railroad track systems. Traditional road-rail vehicles can comprise conventional rubber tires and be fitted with additional flanged steel wheels for engaging rail tracks. Typically, the conventional rubber tires provide the propulsion for the road-rail vehicle, whether on conventional road systems or railroad track systems, and the flanged steel wheels are designed to rotate freely. Road-rail vehicles can include railcar movers, railcar switching vehicles, retrofitted mid-sized trucks, grapple trucks, and material handlers.

Traditional railcar movers and railcar switching vehicles are designed to couple with railcars for purposes of transporting the railcars on existing rail tracks over generally short distances. Specifically, most railcar movers and railcar switching vehicles are designed to move and sort railcars and rolling stock into complete sets of railcars or trains, which is usually done at, or in the vicinity of, a railyard or a freight yard. However, railcar movers and railcar switching vehicles have limited utility and are traditionally expensive to acquire, operate, and maintain. Namely, known railcar movers and railcar switching vehicles are directed specifically at transporting, moving, and sorting railcars and, generally, cannot perform other tasks, such as lifting or grappling certain materials or equipment.

On the other hand, traditional material handlers are designed to be capable of traversing existing rail tracks for purposes of lifting, grappling, storing, hauling, moving, or transporting specific materials and equipment. Typically, conventional material handlers comprise a bed or hauling container for purposes of storing, hauling, moving, and transporting materials and equipment. Further, known material handlers can include a moveable grapple arm located at a rear portion of the bed. The moveable arm may be hydraulically driven by a hydraulic pump that is operably coupled with and driven by an engine output shaft of the engine of the material handler, wherein the hydraulic pump is attached and coupled to the material handler. The moveable arm may comprise a crane winch, grapple, electromagnet, or other equipment and can be adapted for various purposes, including to grapple railroad ties, other railroad-related materials, and the like. In some cases, the moveable arm may be controlled by a remote drive feature.

Recently, existing material handlers have been designed, adapted, and retrofitted to couple with a railcar or piece of rolling stock for purposes of transporting the same on existing rail tracks. For example, some manufacturers and outfitters of material handlers have added a train knuckle to the material handlers to engage and couple with a single railcar. Modifying or adapting known material handlers to transport a railcar provides several advantages over traditional means for transporting railcars. Specifically, providing a material handler with the ability to engage and couple with a single railcar for purposes of transporting the same increases the capacity of the material handler to store, haul, move, and transport materials and equipment. Further, the versatility of material handlers as a road-rail vehicle is advantageous relative to traditional train engines and locomotives. Further yet, such material handlers generally retain the ability to lift and grapple specific materials and equipment. Even further yet, under the present regulatory regime regarding rail-capable vehicles, the use of a material handler on a railroad track system does not require a conductor, who is subject to various regulatory requirements, or additional equipment required under various regulations. Therefore, the use of a material handler to transport a railcar has practical benefits and advantages relative to other means for transporting the same.

However, certain known road-rail vehicles, including conventional material handlers, are typically limited to transporting, at any given time, a single and lightweight railcar. This limitation stems from the inability of known road-rail vehicles to properly recharge the air-brake systems associated with railcars and rolling stock. Such road-rail vehicles must be able to recharge these air-brake systems for purposes of providing the necessary braking force to adequately arrest the movement of the railcars. For example, known material handlers lack adequate means for recharging the air-brake system to overcome the higher momentum associated with the additional weight of multiple railcars or heavy railcars. The problem of inadequately recharging the air-brake system associated with the railcars is compounded by the addition of more railcars or rolling stock to the air-brake system, which contain additional components of the air-brake system that must be recharged, usually by a single source of air compression. This problem is particularly prominent for rail-capable material handlers, and current means have been unable to adequately overcome this deficiency.

Conventional railcar air-brake systems are power braking systems, such as a straight air-brake system or a Westinghouse air-brake system, that rely on compressed air to apply the braking mechanism for purposes of arresting the movement of a railcar or set of railcars. Generally, most of the conventional railcar air-brake systems, such as the Westinghouse air-brake system, are designed as fail-safe systems that rely on pressurized air reservoirs to engage the braking mechanism, whether selectively or automatically in the case of an emergency. In general, fail-safe air-brake systems comprise a train line, a braking mechanism, a brake cylinder coupled to the braking mechanism, an air reservoir, and a valve or series of valves to regulate the air pressure of the railcar air-brake system. Each of these elements typically utilizes air as the desired medium, where the air is pressurized to various pressure levels for purposes of producing a desired result. For example, the air reservoir can be maintained between 125-140 psi. Generally, each railcar in a train contains at least one air reservoir that forms a part of the air-brake system.

In operation, as a fail-safe system, the braking mechanisms of the railcar air-brake systems are released or disengaged only when the air-brake system, as a whole, is properly pressurized. This means that when there is a reduction or loss of air pressure in the air-brake system, which can arise selectively, through a defect, or from a separation of connected railcars, the braking mechanisms are engaged to arrest the movement of the particular railcar or set of railcars.

Modern railcar air-brake systems can also be multifunctional and serve as a service brake system, which allows for the selective application and release of the braking mechanism during normal operation, and an emergency brake system, which allows for the rapid application, either selectively or automatically, of the braking mechanism in the event of an emergency or a fail-safe event, as described herein.

Traditionally, the air pressure of the railcar air-brake system, including in the train line and each air reservoir, is maintained by an air compressor or series of air compressors integrated with or located on a train engine or locomotive. To adequately recharge an air-brake system, especially an air-brake system comprised or multiple railcars and air reservoirs, a high flow volume or a near-constant airflow from an air compressor to the air-brake system is required, both of which can be provided by an air compressor or series of air compressors integrated with or located on a train engine or locomotive.

Until now, it has been particularly difficult to apply the principles of conventional railcar air-brake systems to road-rail vehicles, including material handlers that have been modified or adapted for purposes of engaging and coupling with a railcar. For example, the train knuckles that most manufacturers and outfitters add to material handlers for purposes of engaging and coupling with a railcar generally impede the ability to recharge the railcar air-brake system. Further, known means for recharging the air-brake system of a multi-car train transported by a modified or adapted material handler have been unable to provide the necessary airflow without overburdening or over-speeding the respective air compression system. Further yet, known means for recharging the air-brake system of a multi-car train transported by a modified or adapted material handler have been unable to provide the necessary airflow without sacrificing the utility or other useful aspects of the material handler.

Specifically, to adequately recharge the air-brake system of a multi-railcar train transported by a modified or adapted material handler, the conventional solution has been to incorporate a self-sustaining, stand-alone air compressor or series of such air compressors driven by a separate auxiliary engine or motor on to the material handler. However, the use of such self-sustaining, stand-alone air compressor or series of such air compressors is not without its deficiencies. Such self-sustaining, stand-alone air compressor or series of such air compressors are generally limited to recharging an air-brake system by a near-constant low-volume airflow, which takes more time to recharge the air-brake system and is not preferable for selectively and quickly recharging the air-brake system of a multi-car train, where the length of the air-brake system is further extended by the addition of each additional railcar. Further, attaching and coupling a self-sustaining, stand-alone air compressor to a material handler significantly diminishes the utility of the vehicle. Specifically, the self-sustaining, stand-alone air compressor or series of such air compressors require and occupy physical space on a material handler that is conventionally reserved for the handling, storage, hauling, and moving of materials and equipment, which, unfortunately, is the primary purpose of such vehicles. Further, the presence of an at least one self-sustaining, stand-alone air compressor on a material handler that comprises a moveable arm located at a rear portion or the rearward most portion of the material handler can inhibit the range of movement of the moveable arm and increase the danger associated with the use of a remote drive tool to control the moveable arm. Such effects significantly diminish the full utility of the moveable arm. Furthermore, these systems require the cost and maintenance associated with an additional auxiliary engine.

An alternative to using such self-sustaining, stand-alone air compressors has been to use a partially integrated air compressor, which is often directly engaged with and driven by the transmission of the material handler. The use of such partially integrated air compressors is not without its deficiencies. In particular, in order to provide a high flow volume for recharging the air-brake system, the operator risks overburdening or over-speeding such air compressor or series of such air compressors, which may negatively affect the mechanical features and longevity of the same. Therefore, such partially integrated air compressor or series of such air compressors are generally limited to recharging an air-brake system by a near-constant low-volume airflow, which takes more time to recharge the air-brake system and is not preferable for selectively and quickly recharging the air-brake system of a multi-car train, where the length of the air-brake system is further extended by the addition of each additional railcar. Further, in order to power or drive the partially integrated air compressors or series of such air compressors, the engine of the material handler must engage the transmission, which requires the material handler to be driven and not merely idling. Therefore, to provide the necessary near-constant low-volume airflow, as discussed above, the material handler cannot be idling or stationary.

Further, existing means for recharging a railcar air-brake system for a rail-capable material handler do not contain adequate diagnostic capabilities for remotely monitoring or controlling the status of the air-brake system across multiple railcars. Specifically, known diagnostic capabilities do not include capabilities for remotely accessing information regarding the status of the air-brake system or using such information to control or adjust features of the air-brake system, including doing so remotely.

Therefore, a need exists for a system for recharging a railcar air-brake system for a road-rail vehicle or rail-capable material handler adapted for transporting at least one railcar, wherein such system is capable of providing the necessary airflow to adequately recharge the air-brake system of multiple railcars without overburdening the air compression system or requiring the material handler or vehicle to be driven. A need also exists for a system that does not significantly diminish the utility of the material handler or vehicle.

SUMMARY OF THE INVENTION

The present invention is directed to a system for recharging a railcar air-brake system for road-rail vehicle, such as a rail-capable material handler, adapted for transporting at least one railcar. The present invention may be further directed to a method for making a road-rail vehicle with such a system.

In one embodiment, the system may generally comprise a hydraulic pump, an air compressor, and at least one railcar air-brake system. The air compressor may be operably coupled with and driven by the hydraulic pump, and may further be operably coupled with the at least one railcar air-brake system. In another embodiment, the system may further comprise an engine output shaft, and the hydraulic pump may be operably coupled with and driven by the engine output shaft. In yet another embodiment, the system may further comprise a gearbox. The gearbox may be operably coupled with and driven by the engine output shaft, and the hydraulic pump may be operably coupled with and driven by the gearbox. The gearbox may have an input-to-output ratio of approximately 1:1.8, for example.

The present invention is also directed to a road-rail vehicle having a front end, a rear end, and at least one train knuckle. The hydraulic pump may be operably coupled with and driven by an output shaft of the vehicle's engine. The engine output shaft can generally extend rearwardly toward the rear end of the road-rail vehicle. The at least one train knuckle can be located proximate the front end of the road-rail vehicle. In one embodiment, the gearbox can be located proximate the front end of the road-rail vehicle. In another embodiment, the system may further comprise a remote drive tool.

In yet another embodiment, the hydraulic pump can be a variable displacement hydraulic pump. In even yet another embodiment, the system may further comprise a remote diagnostic tool.

In another embodiment, the present invention is further directed at a method for making a road-rail vehicle with the system. The method can generally comprise the steps of providing the system and attaching the system to a road-rail vehicle. In one embodiment, the method can further comprise the step of operably coupling the hydraulic pump with an engine output shaft. In another embodiment, the method can further comprise the steps of operably coupling the engine output shaft with a gearbox and operably coupling the hydraulic pump with the gearbox. In yet another embodiment, the method can further comprise the step of installing the at least one railcar air-brake system.

BRIEF DESCRIPTION OF THE SEVERAL VIEWS OF THE FIGURES AND DRAWINGS

In the accompanying drawings, which form a part of the specification and are to be read in conjunction therewith in which like reference numerals are used to indicate like or similar parts in the various views.

DETAILED DESCRIPTION OF THE INVENTION

Various embodiments of the present invention are described and shown in the accompanying figures and drawings. For purposes of clarity in illustrating the characteristics of the present invention, proportional relationships of the elements have not necessarily been maintained in the figures and drawings. It will be understood that any dimensions included in the figures and drawings are simply provided as examples and dimensions other than those provided therein are also within the scope of the invention.

The description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

One objective of the present invention is to provide a system for recharging railcar air-brake systems for a road-rail vehicle, including a rail-capable material handler or other suitable rail-capable road-rail vehicle, configured for transporting at least one railcar. Another objective of the present invention is to provide an air compression system adapted for generating and providing near-constant low-volume airflow to recharge the respective air-brake systems without requiring the road-rail vehicle to be driven. A further objective of the present invention is to provide a system for recharging railcar air-brake systems for a road-rail vehicle adapted for transporting at least one railcar that does not significantly diminish the utility of the road-rail vehicle. The system can be further adapted for recharging railcar air-brake systems for a road-rail vehicle adapted for transporting at least two railcars.

Figure 1:
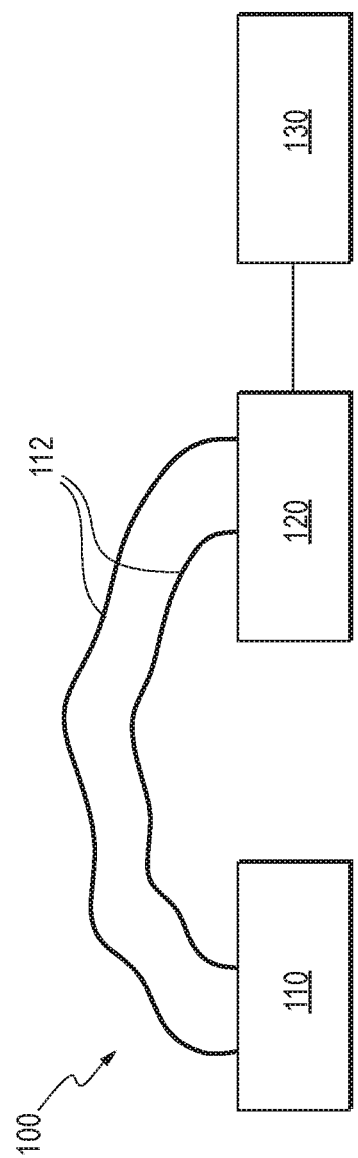
FIG. 1 is a schematic view representing a system according to one embodiment of the present invention.

As best illustrated in FIG. 1, one embodiment of the present invention is designed to provide a system 100 for recharging railcar air-brake systems for a road-rail vehicle (not shown) that generally comprises a hydraulic pump 110, an air compressor 120, and at least one railcar air-brake system 130. The air compressor 120 may be operably coupled with and driven by the hydraulic pump 110, and may further be operably coupled with the at least one railcar air-brake system 130. The air compressor 120 may be hydraulically coupled with the hydraulic pump 110 via hydraulic transmission means 112, including, without limitation, hydraulic tubing, pipes, or hoses, further comprising fittings and other related accessories. The air compressor 120 may be operably coupled with the at least one railcar air-brake system 130 via hydraulic tubing, pipes, or hoses (not shown) further comprising fittings and other related accessories.

In one embodiment, the system 100 may further comprise a remote diagnostic tool (not shown) for monitoring the status and for controlling the operational characteristics of the system 100, including the railcar air-brake system 130, remotely. The remote diagnostic tool may be adapted to be in wireless communication with the railcar air-brake system 130. By controlling the hydraulic pump 110 of the present invention, an operator can regulate the airflow of the system 100 to properly pressurize the railcar air-brake system 130. In one embodiment, a valve or series of valves to regulate air pressure of the railcar air-brake system 130 can be configured to facilitate remote monitoring and control of the system 100. In such an embodiment, sensors or a series of sensors can measure the air pressure in the various elements of the railcar air-brake system 130 and communicate the same to the remote diagnostic tool. Such sensors can include pressure sensors, impact sensors, strain gauges, accelerometers, non-physical contact sensors, acoustic sensors, infra-red sensors, ultrasonic sensors, digital cameras or other optical instruments, structured light or stereo camera vision sensors, speed sensors, capacitive moisture sensors, mass flow sensors, combinations of the foregoing, or any other suitable presently known or future developed sensing means. In one embodiment, the remote diagnostic tool may comprise a mobile display, which can include a computer tablet, smart phone, personal data assistant ("PDA") and/or the like, for providing a digital, visual, and/or audible output to an operator.

According to one embodiment, the hydraulic pump 110 of the present invention can comprise a variable displacement hydraulic pump. A variable displacement hydraulic pump is a positive-displacement pump that can displace or deliver the same amount of liquid for each rotating cycle of the pump, which means that the delivery of hydraulic fluid per cycle is nearly constant, regardless of changes in the pressure against which the pump is working. The output of a variable displacement pump can be altered by changing the speed of the pump or the geometry of the displacement chamber of the pump. In one embodiment, the hydraulic pump 110 of the present invention can have optimal operation when rotating at approximately one thousand (1,000) revolutions per minute, although other pumps may alternatively be used.

According to another embodiment, the hydraulic pressure or energy generated by the hydraulic pump 110 of the present invention can drive the air compressor 120, which can be achieved by converting the hydraulic energy to mechanical energy. The hydraulic energy generated by the hydraulic pump 110 of the present invention can be transferred to the air compressor 120 by a variety of means for purposes of driving the same. In one embodiment, the hydraulic energy generated by the hydraulic pump 110 of the present invention can be transferred to the air compressor 120 by hydraulic fluid via the hydraulic transmission means 112, such as hoses, lines, conduits, or other suitable means. The hydraulic energy generated by the hydraulic pump 110 can be converted to mechanical energy by a reversible variable displacement pump coupled with the air compressor 120. However, it will be understood that the hydraulic energy generated by the hydraulic pump 110 can be converted to mechanical energy by any variety of means, whether presently known or later developed. The near-constant hydraulic energy provided by the hydraulic pump 110, which can be a variable displacement hydraulic pump, allows the air compressor 120 to generate near-constant airflow for purposes of recharging the air-brake system 130. However, it will be understood that the air compressor 120 can be driven without converting the hydraulic energy to mechanical energy.

Figure 2:
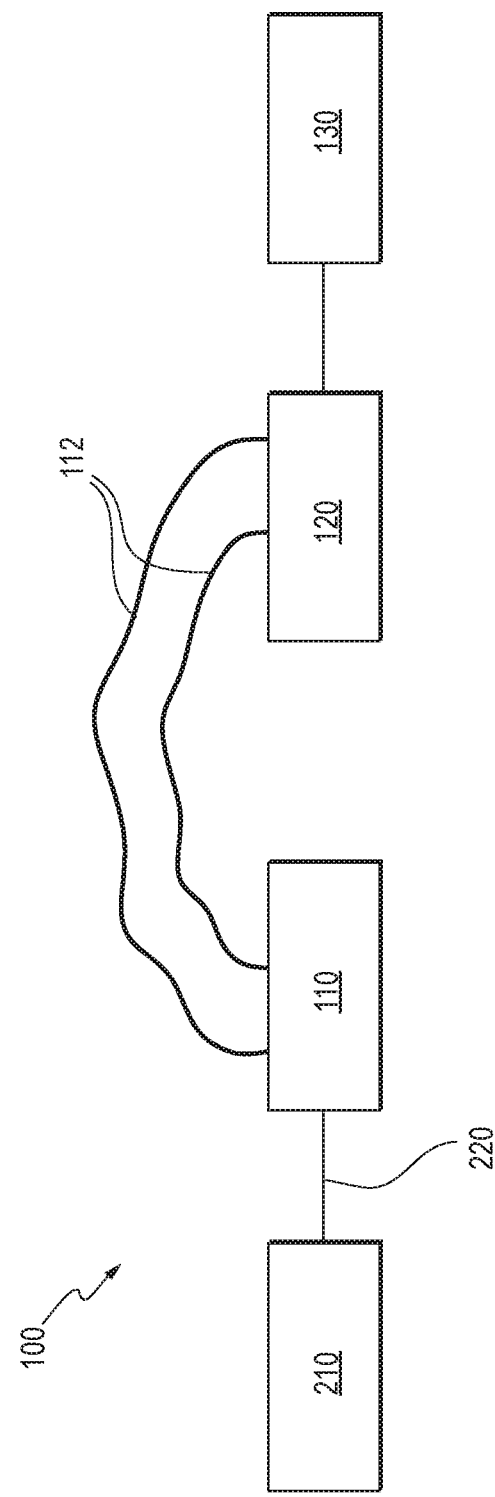
FIG. 2 is a schematic view representing a system according to another embodiment of the present invention.

As best illustrated in FIG. 2, another embodiment of the present invention is designed to provide a system 100 for recharging railcar air-brake systems for a road-rail vehicle (not shown) that further comprises an engine 210 and an engine output shaft 220. The engine output shaft 220 may be operably coupled with and driven by the engine 210, and the hydraulic pump 110 may be operably coupled with and driven by the engine output shaft 220. In one embodiment, the hydraulic pump 110 of the present invention may be directly coupled with and driven by the engine output shaft 220. In another embodiment, the hydraulic pump 110 of the present invention can convert the mechanical energy of the engine 210 and/or engine output shaft 220 to hydraulic energy.

According to one embodiment of the present invention, the air compressor 120 coupled with and driven by the hydraulic pump 110 may be smaller in size compared to known self-sustaining, stand-alone air compressor and even partially integrated air compressors, as described herein. Specifically, since the air compressor 120 may be operably coupled with and driven by the engine 210, via the hydraulic pump 110, the air compressor 120 may not require providing its own operating energy through self-sustaining means, including all of the additional mechanical features and elements thereof. Therefore, the air compressor 120 of the present invention may comprise less elements than partially integrated air compressors. With a comparatively smaller size and volume than the known self-sustaining, stand-alone air compressor and partially integrated air compressors, the air compressor 120 of the present invention is not subject to the same or similar deficiencies. Namely, the air compressor 120 of the present invention may not significantly diminish the utility of the rail-capable material handler. The smaller size of the air compressor 120 of the present invention does not require significant physical space to be occupied on a rail-capable vehicle and does not inhibit the range of movement of a moveable arm (not shown) of the rail-capable vehicle, or create other dangers situations.

Figure 3:
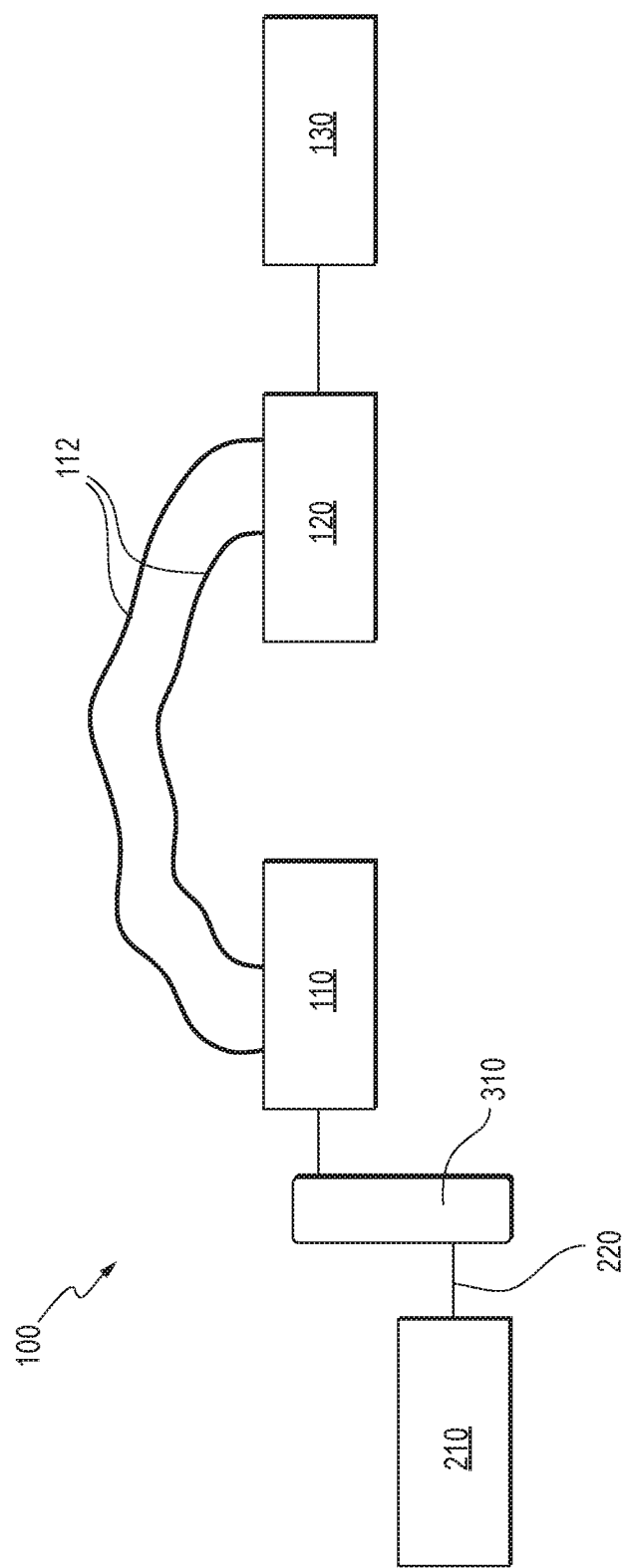
FIG. 3 is a schematic view representing a system according to yet another embodiment of the present invention.

As best illustrated in FIG. 3, yet another embodiment of the present invention is designed to provide a system 100 for recharging railcar air-brake systems for a road-rail vehicle (not shown) that further comprises a gearbox 310. The gearbox 310 may be operably coupled with and driven by the engine output shaft 220, and the hydraulic pump 110 may be operably coupled with and driven by the gearbox 310. In one embodiment, the gearbox 310 of the present invention may be directly coupled with and driven by the engine output shaft 220. The gearbox 310 of the present invention may be designed to receive an input shaft (not shown) and drive an output shaft (not shown). The gearbox 310 may generally comprise an intermeshing series of gears (not shown) to provide a desired input-to-output ratio. In one embodiment, the input-to-output ratio can be between approximately 1:0.25 and approximately 1:4. In another embodiment, the input-to-output ratio can be between approximately 1:0.5 and approximately 1:2. In yet another embodiment, the input-to-output ratio can be between approximately 1:0.55 and approximately 1:1.9. In even yet another embodiment, the input-to-output ratio can be approximately 1:1.8. By way of example, this means that the gearbox 310 could drive an output shaft (for driving the hydraulic pump 110) at approximately one thousand (1,000) revolutions per minute if the received input shaft is rotating at approximately six hundred (600) revolutions per minute (which may be the idle speed of a common diesel engine). However, it will be understood, that the input-to-output ratio of the gearbox 310 can assume any proportional ratio, and may be selected based on (i) an engine idle speed, and (ii) an optimal pump speed.

Figure 4:
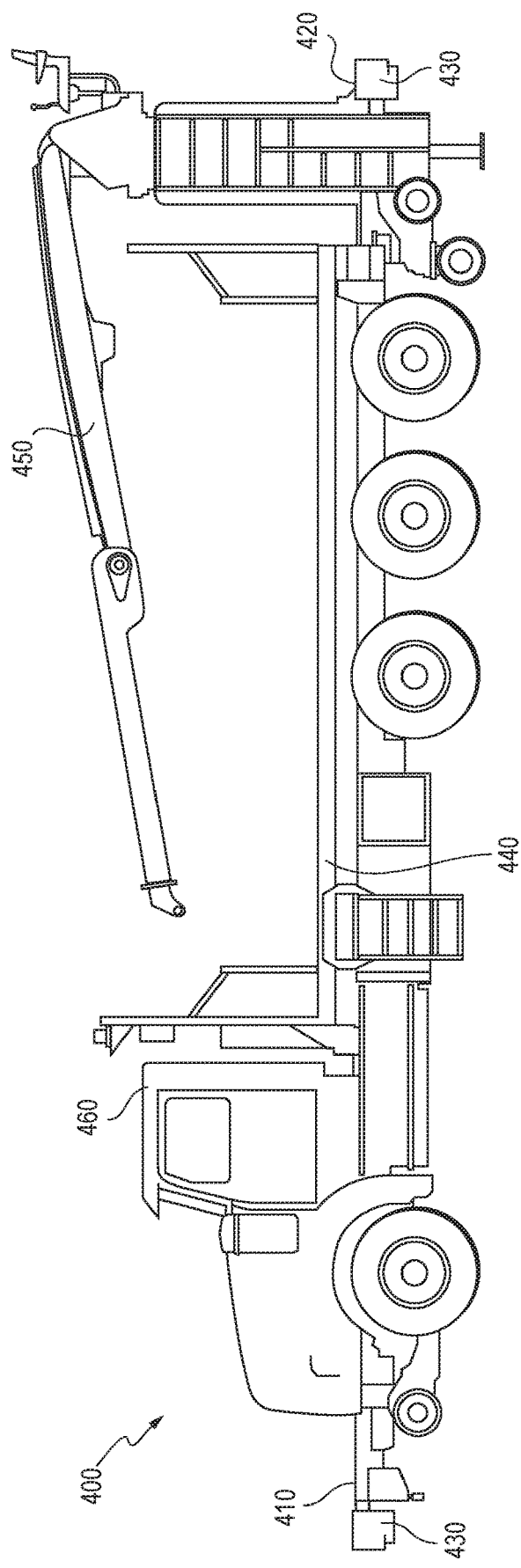
FIG. 4 is a side view of a road-rail vehicle according to one embodiment of the present invention.

As shown in FIG. 4, according to one embodiment of the present invention, the road-rail vehicle 400 may generally comprise a front end 410, a rear end 420, and at least one train knuckle 430 for attaching to a railcar (not shown). In another embodiment, the road-rail vehicle 400 may further comprise a bed or hauling container 440, a moveable arm 450, and a cab 460 (located proximate the front end 410).

In another embodiment, the road-rail vehicle 400 may further comprise a remote drive tool (not shown) for monitoring and controlling the operational characteristics of the moveable arm 450 remotely. The remote drive tool may be adapted to be in wireless communication with the road-rail vehicle 400. In one embodiment, the moveable arm 450 may comprise sensors for monitoring the operation of the moveable arm 450. Such sensors can include pressure sensors, impact sensors, strain gauges, accelerometers, non-physical contact sensors, acoustic sensors, infrared sensors, RADAR sensors, LIDAR sensors, ultrasonic sensors, digital cameras or other optical instruments, structured light or stereo camera vision sensors, speed sensors, capacitive moisture sensors, mass flow sensors, yield sensors, global positioning system ("GPS") sensors, combinations of the foregoing, or any other suitable presently known or future developed sensing means. In another embodiment, the remote drive tool may comprise a mobile display, which can include a computer tablet, smart phone, PDA and/or the like, for providing a digital or audible output to an operator.

Figure 5:
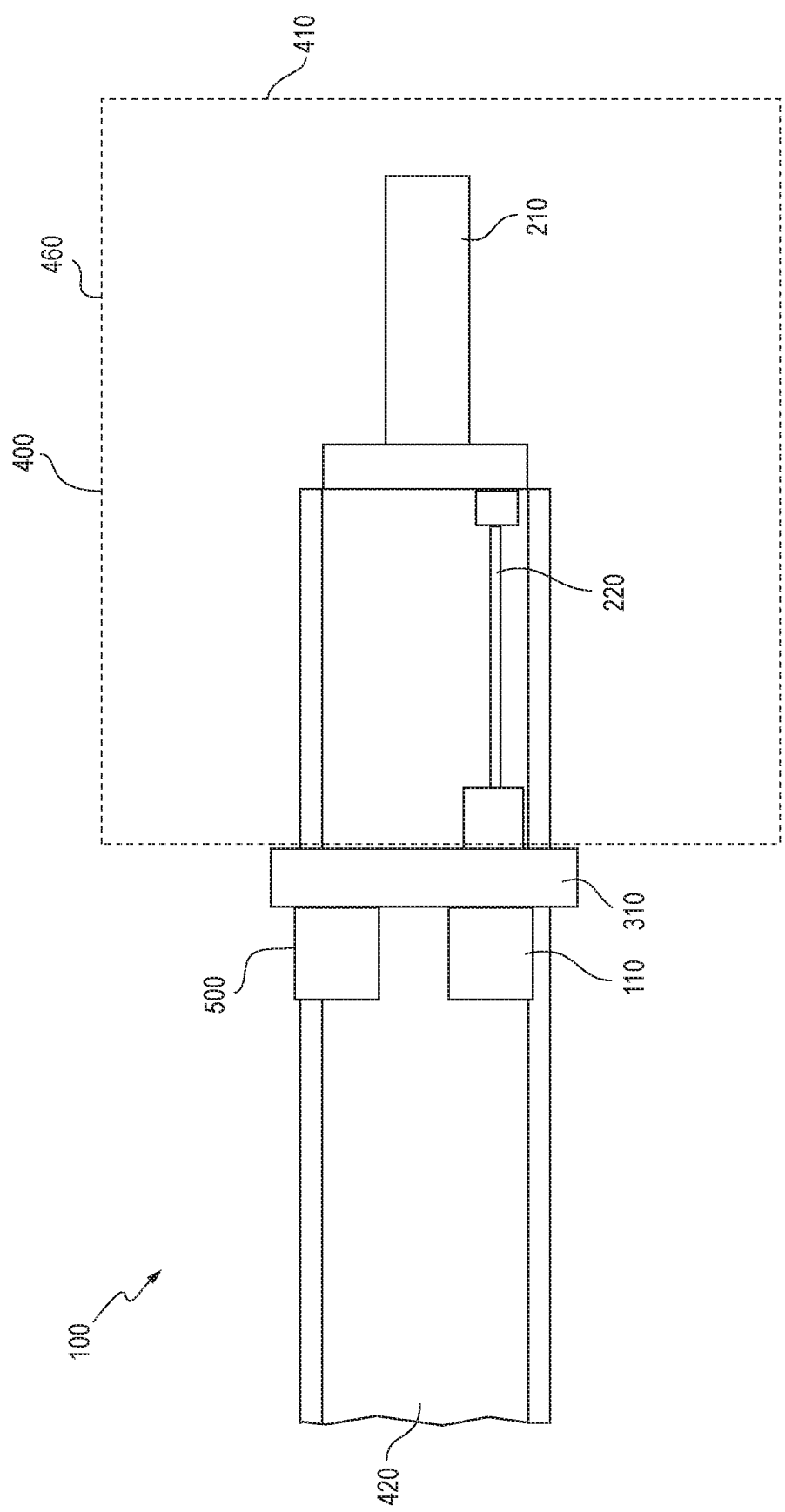
FIG. 5 is a schematic top view representing a portion of a system attached to the road-rail vehicle according to one embodiment of the present invention.
Figure 6:
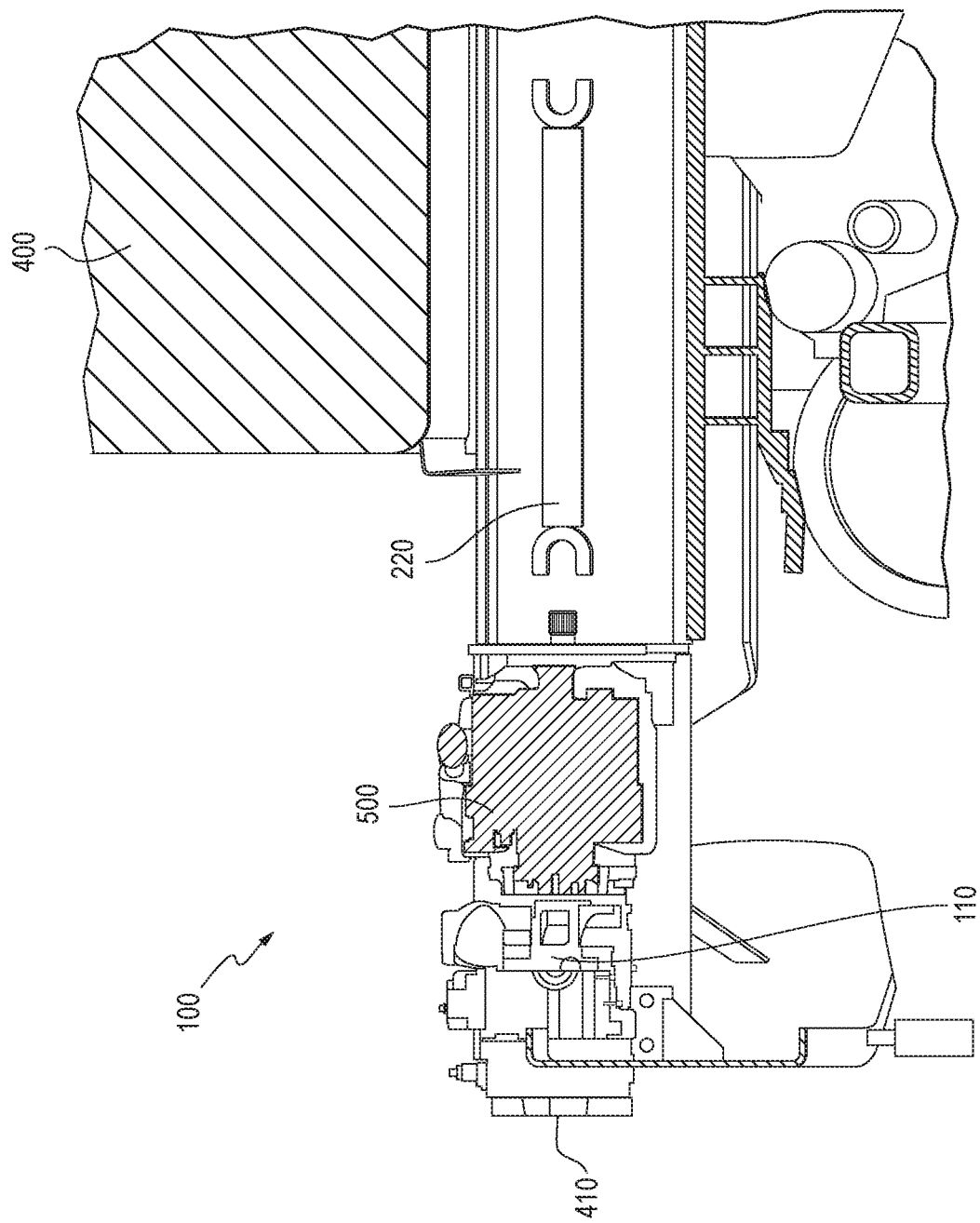
FIG. 6 is a cross-sectional representation of a portion of the system according to the teachings of a first embodiment of the present invention.
Figure 7:
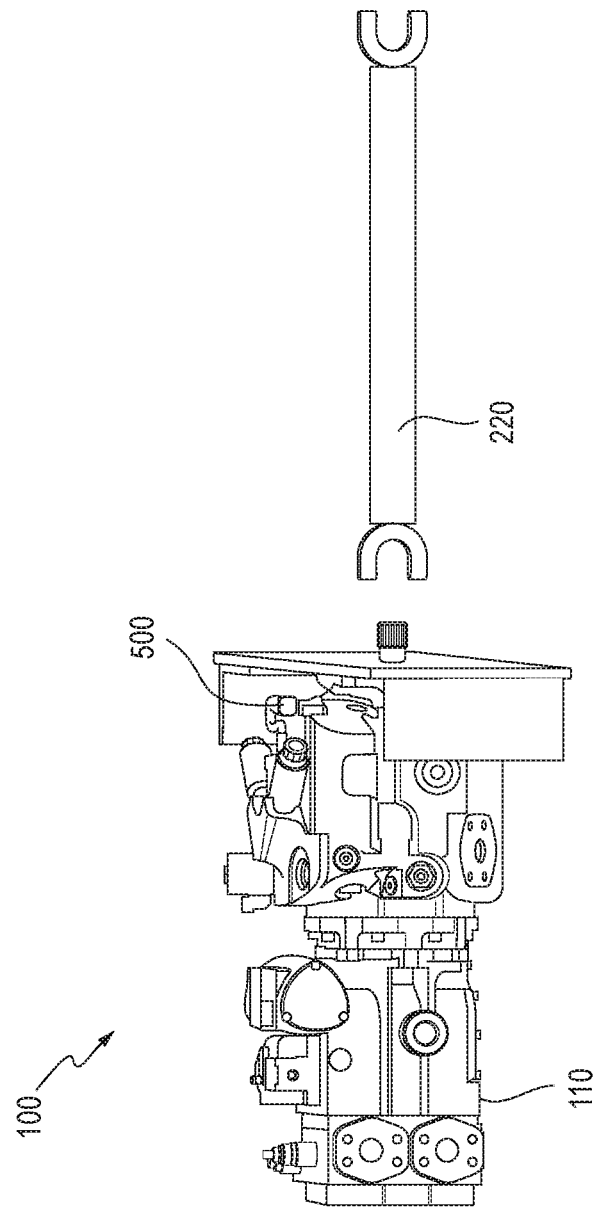
FIG. 7 is a side schematic representation of a portion of the system of FIG. 6.
Figure 8:
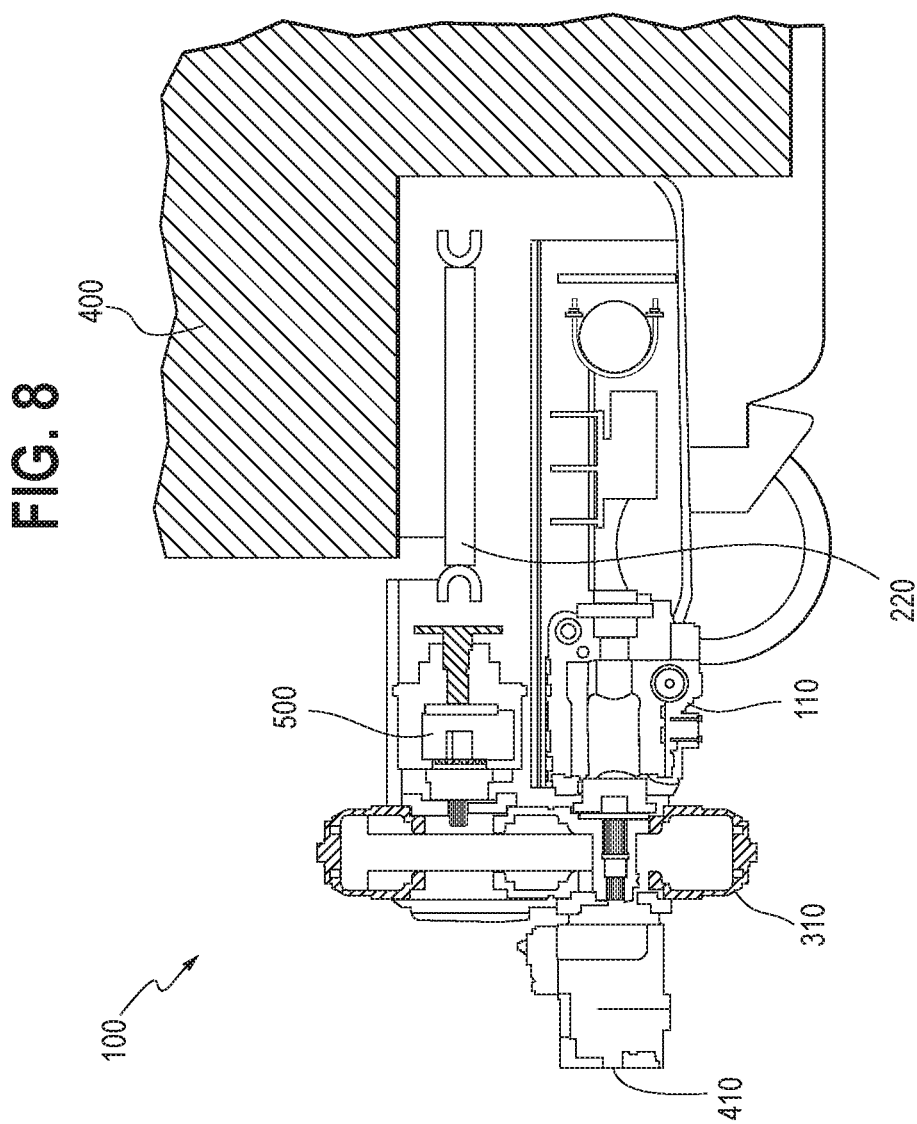
FIG. 8 is a cross-sectional representation of a portion of the system according to the teachings of a second embodiment of the present invention.
Figure 9:
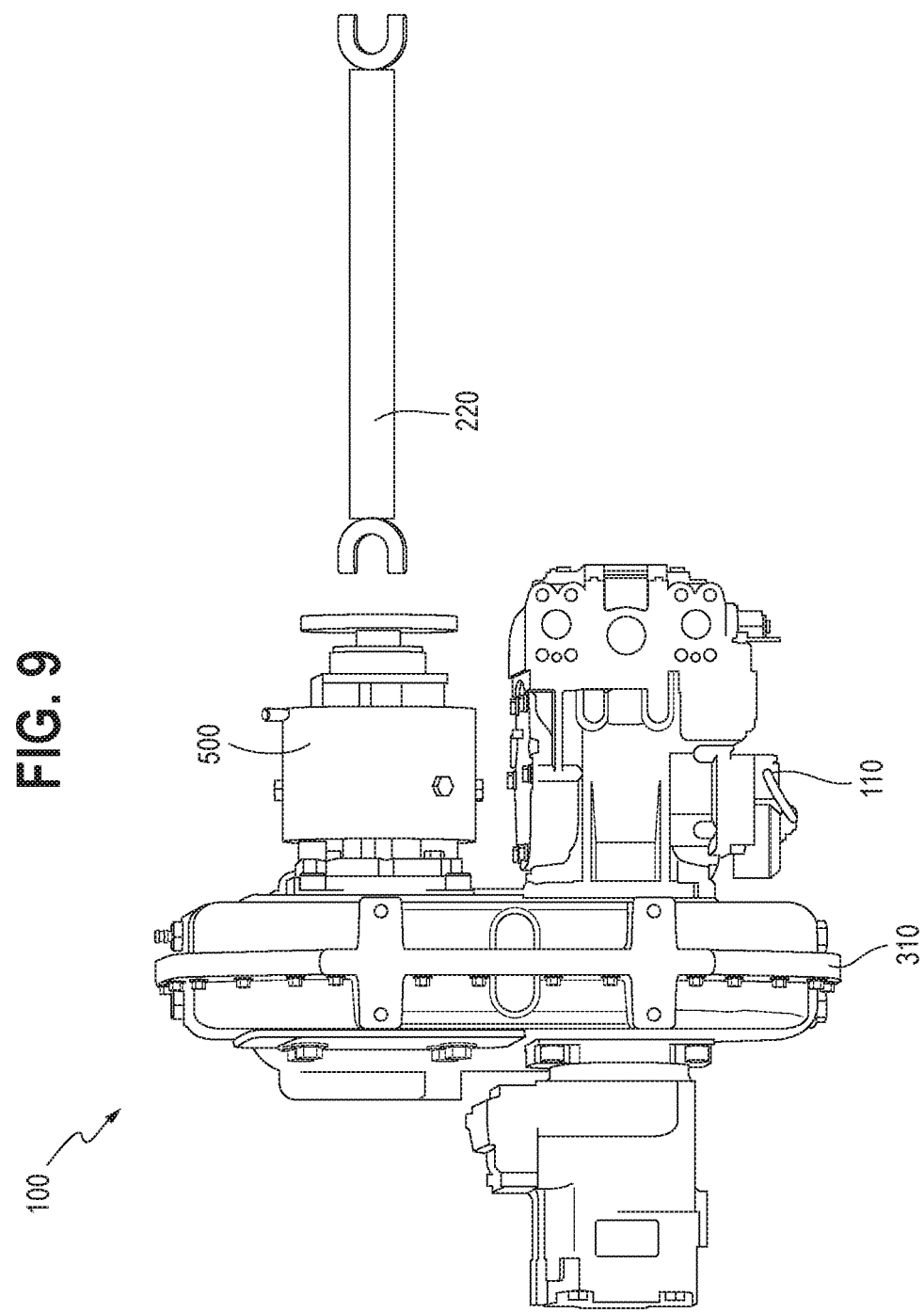
FIG. 9 is a side schematic representation of a portion of the system of FIG. 8.
Figure 10:
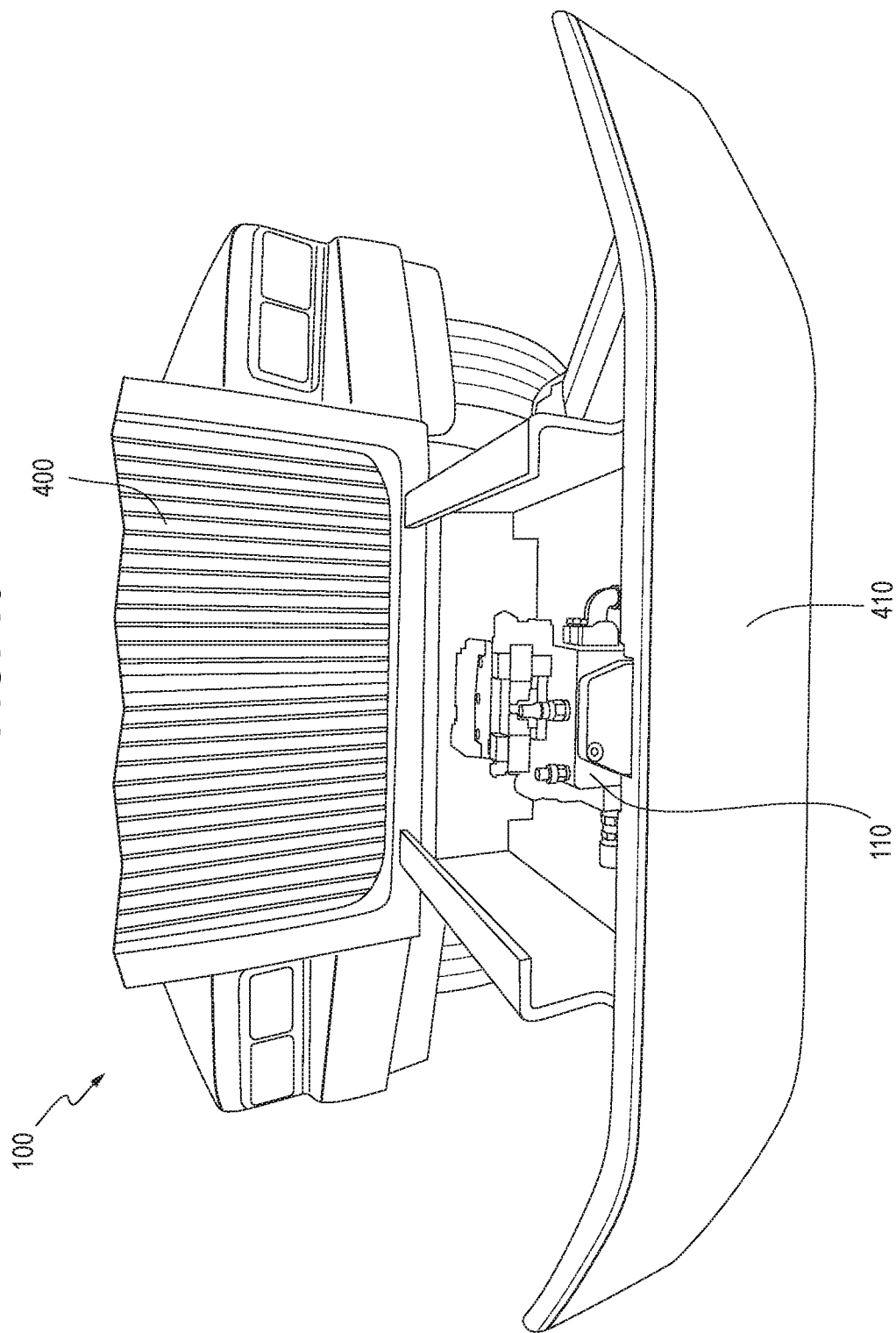
FIG. 10 is a front perspective view of a portion of a system attached to a road-rail vehicle according to the first embodiment of the present invention.
Figure 11:
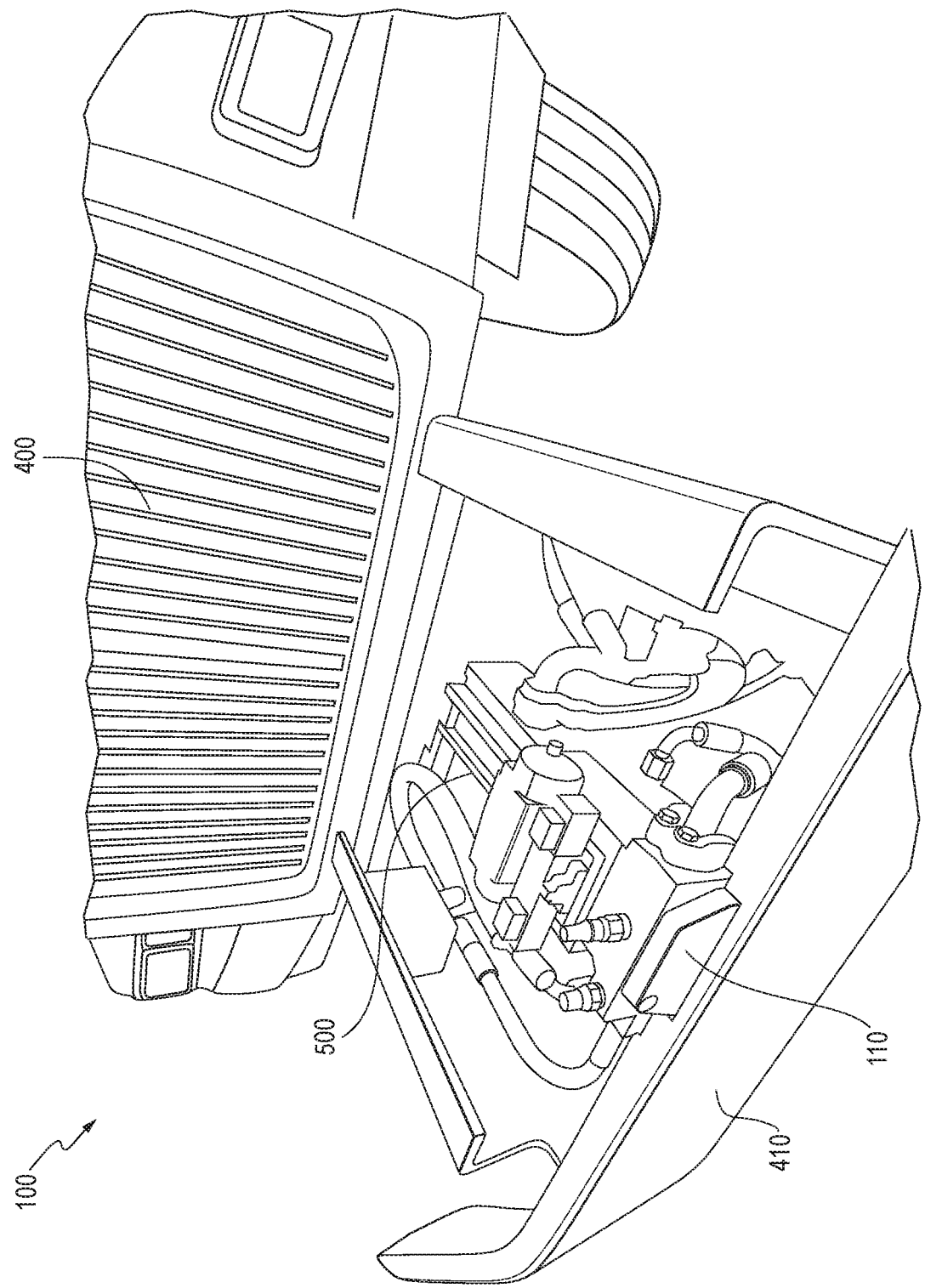
FIG. 11 is a side perspective representation of the portion of the system attached to the road-rail vehicle of FIG. 10.
Figure 12:
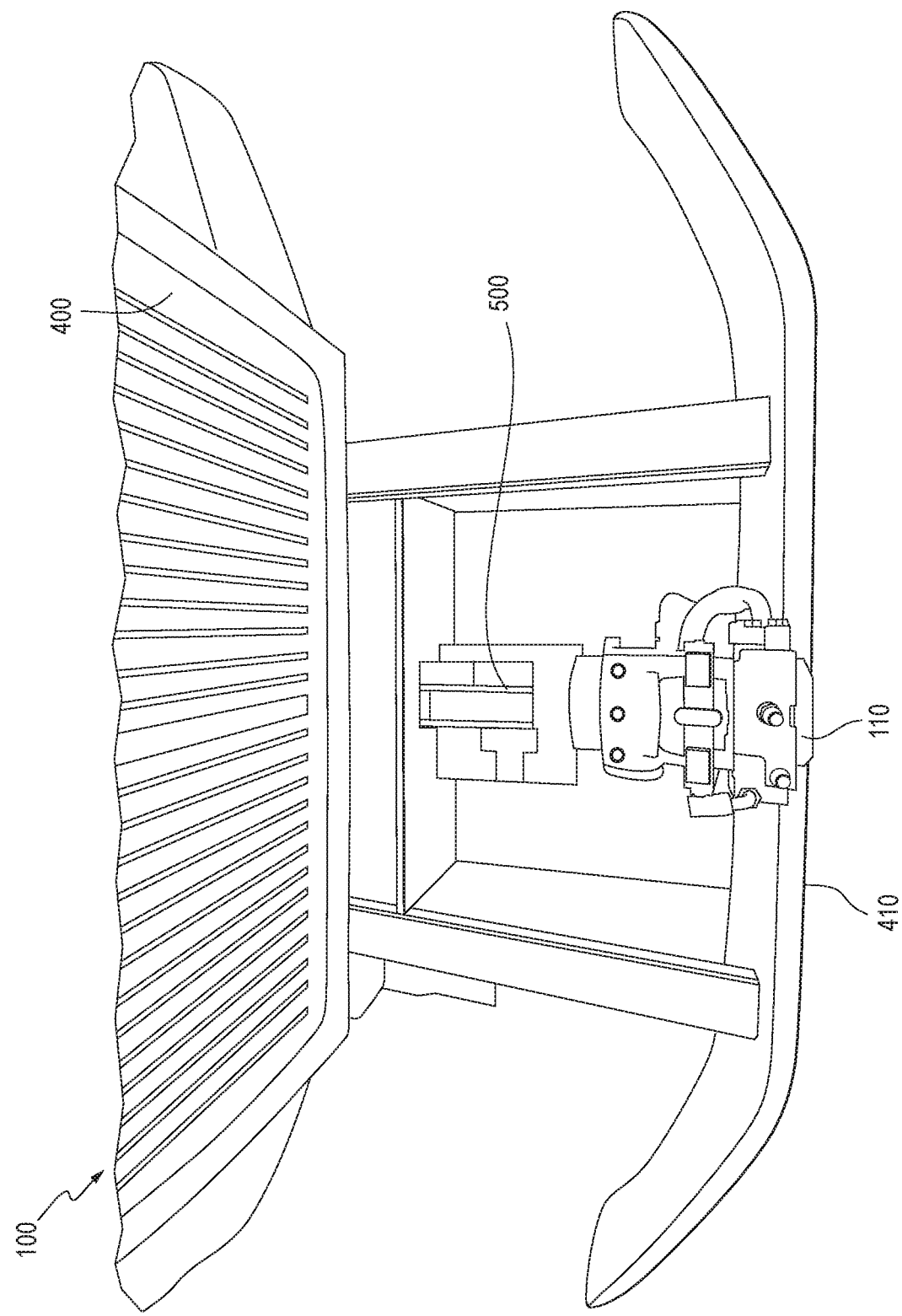
FIG. 12 is a top perspective representation of the portion of the system attached to the road-rail vehicle of FIGS. 10 and 11.
Figure 13:
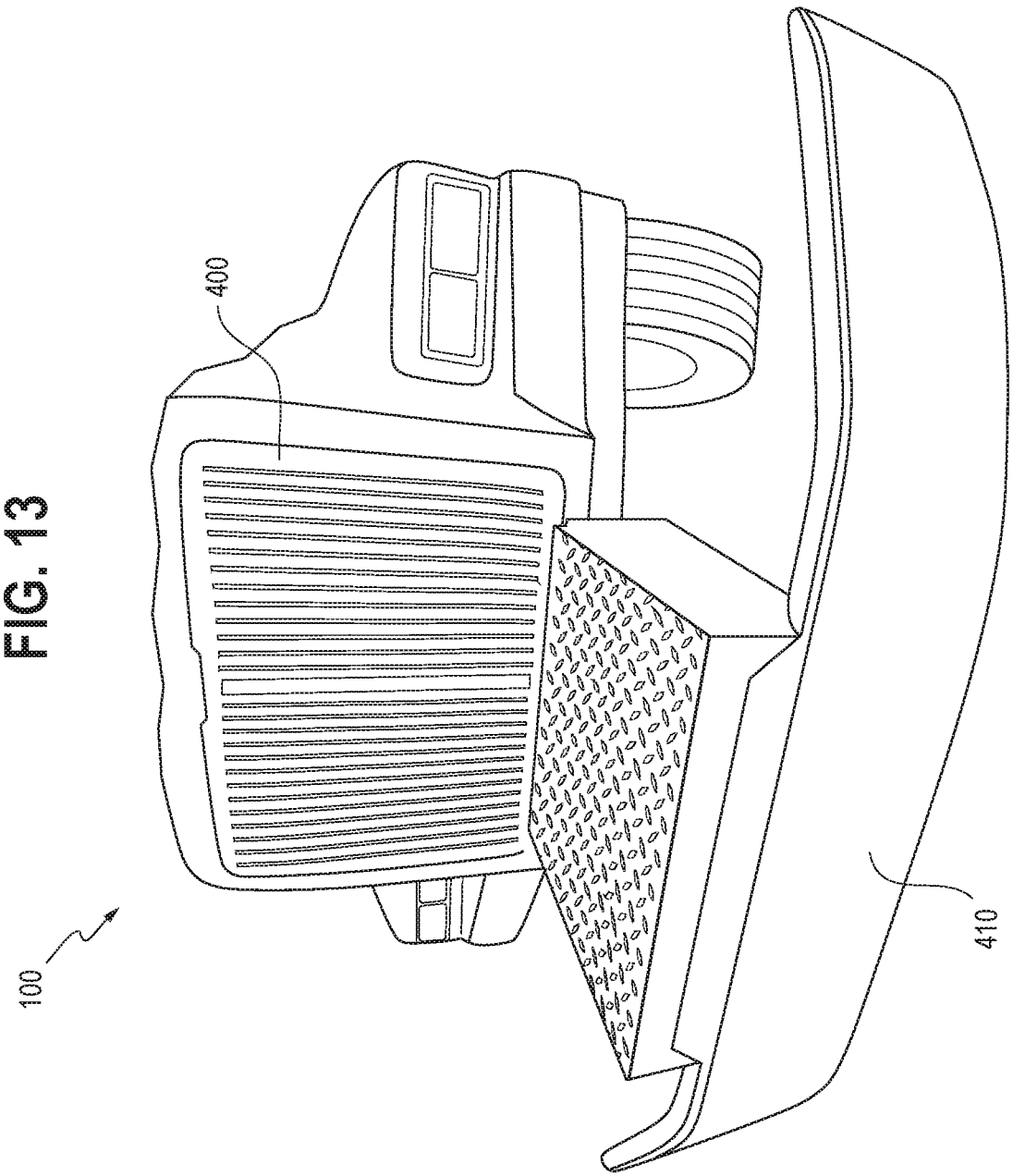
FIG. 13 is a perspective representation of the portion of the system attached to the road-rail vehicle of FIGS. 10-12, illustrating a cover place thereon.

As best illustrated in FIG. 5, another embodiment of the present invention is designed to provide a system 100 for recharging railcar air-brake systems for a road-rail vehicle 400. In one embodiment, the road-rail vehicle 400 may comprise the engine 210 generally adjacent the front end 410. The engine output shaft 220 may be operably coupled with and driven by the engine 210. In another embodiment, the road-rail vehicle 400 may further comprise the gearbox 310. The gearbox 310 may be operably coupled with and driven by the engine output shaft 220, and the hydraulic pump 110 may be operably coupled with and driven by the gearbox 310. As further illustrated in FIG. 5, the road-rail vehicle 400 may further comprise a hydraulic pump 500 that is used to hydraulically drive the moveable arm 450, and the engine output shaft 220 can be coupled with and drive the hydraulic pump 500.

As best illustrated in FIG. 5, in one embodiment, the hydraulic pump 110 and the hydraulic pump 500 may be operably coupled with and driven by the engine output shaft 220, including simultaneously. It will be understood that the hydraulic pump 110 and the hydraulic pump 500 may be in series or driven together by the engine output shaft 220. In another embodiment, the hydraulic pump 110 of the present invention can be generally located forward of hydraulic pump 500 relative to the road-rail vehicle 400.

As best illustrated in FIG. 5, in one embodiment, the gearbox 310 and the hydraulic pump 500 may be operably coupled with and driven by the engine output shaft 220, including simultaneously. It will be understood that the gearbox 310 and the hydraulic pump 500 may be in series or driven together by the engine output shaft 220. In another embodiment, the gearbox 310 of the present invention can be generally located forward of hydraulic pump 500 relative to the road-rail vehicle 400.

According to one embodiment, as further illustrated in FIG. 5, the engine output shaft 220 can generally extend rearwardly from the engine 210 and toward the rear end 420 of the road-rail vehicle 400. It will be understood that if the engine output shaft 220 generally extends rearwardly toward the rear end 420 of the road-rail vehicle 400, this may provide space on the front end 410 of the road-rail vehicle 400 to permit the addition of a train knuckle (not shown in FIG. 5) to the front end 410 of the road-rail vehicle 400. With a train knuckle located proximate the front end 410 and a train knuckle (not shown) located proximate the rear end 420, the road-rail vehicle 400 can be capable of directly coupling with at least two railcars (not shown) (i.e., a railcar at the front end 410 and a railcar at the rear end 420 of the road-rail vehicle 400) via the train knuckles. According to another embodiment, as illustrated in FIGS. 6-9, the engine output shaft 220 may be operably coupled with and driven by the engine (not shown) and generally extend toward the front end 410 or to a forward portion or the forward most portion of the road-rail vehicle 400.

The general location of the hydraulic pump 110 relative to the road-rail vehicle 400 can depend on the orientation of the engine output shaft 220 relative to the engine 210 (i.e., whether the output shaft 220 extends forward or rearward from the engine 210). In one embodiment, where the engine shaft 220 generally extends toward the rear end 420 of the road-rail vehicle 400, as best shown in FIG. 5, the hydraulic pump 110 can be located rearward of the engine 210 and generally near the cab 460, and be operably coupled with and driven by the engine output shaft 220. In another embodiment, where the engine output shaft 220 generally extends toward the front end 410 of the road-rail vehicle 400, as demonstrated best in FIGS. 6-9, the hydraulic pump 110 can be located forward of the engine (not shown) and generally near the front end 410, and be operably coupled with and driven by the engine output shaft 220.

Similarly, the general location of the gearbox 310 relative to the road-rail vehicle 400 can depend on the orientation of the engine output shaft 220 relative to the engine 210. In one embodiment, where the engine output shaft 220 generally extends toward the rear end 420 of the road-rail vehicle 400, as best shown in FIG. 5, the gearbox 310 can be located rearward of the engine 210, generally near the cab 460, and be operably coupled with and driven by the engine output shaft 220. In another embodiment, where the engine output shaft 220 generally extends toward the front end 410 of the road-rail vehicle 400, as demonstrated best in FIGS. 8 and 9, the gearbox 310 can be located forward of the engine 210, generally near the front end 410, and be operably coupled with and driven by the engine output shaft 220.

Under traditional operating conditions, the engine 210 of the road-rail vehicle 400 may be capable of idling while simultaneously driving the engine output shaft 220. That is, regardless of whether the engine 210 of the road-rail vehicle 400 is driven or idling, the engine output shaft 220 is continually rotating. According to one embodiment, the engine 210 of the road-rail vehicle 400 may be a diesel engine, where the diesel engine may be capable of driving the engine output shaft 220 at approximately six hundred (600) revolutions per minute when idling. When accelerated, the diesel engine may be capable of driving the engine output shaft 220 at well above six hundred (600) revolutions per minute. However, it will be understood that the engine 210 of the road-rail vehicle 400, according to one embodiment of the present invention, can comprise any engine type, whether presently known or later developed, and be capable of operating and driving the engine output shaft 220 at a variety of revolutions per minute when idling or accelerated.

In one embodiment, the combination of the diesel engine of the road-rail vehicle 400 with the gearbox 310 having an input-to-output ratio of 1:1.8 can create optimal means for driving the hydraulic pump 110 at approximately one thousand (1,000) revolutions per minute. This, in turn, can create optimal means for driving an air compressor 120 or series of air compressors 120, via the hydraulic pump 100, at a near-constant rate for purposes of recharging the air-brake system 130. In one embodiment, the air compressor 120 can be driven by an idling engine 210 of the road-rail vehicle 400 to provide a near-constant low-volume airflow necessary to properly recharge the air-brake system 130. Therefore, the air-brake system 130 can be recharged when the road-rail vehicle 400 is idling and not being driven. In another embodiment, this can be achieved when the hydraulic pump 110 is a variable displacement hydraulic pump, which can provide the necessary energy, via hydraulic energy, to drive the air compressor 120 through unconventional means that do not rely on the transmission of the road-rail vehicle 400. Further, the variable displacement hydraulic pump can be optimized when operating at one thousand (1,000) revolutions per minute, which can be achieved by increasing the idling rate of rotation for the diesel engine of the road-rail vehicle 400 from six hundred (600) revolutions per minute to one thousand eighty (1,080) revolutions per minute via the gearbox 310 with an input-to-output ratio of 1:1.8.

According to one embodiment, the system 100 can be operated by a preprogrammed computer or a human operator. To operate the system 100, the computer or the operator can alter various aspects of the system 100 to achieve the desired result. For example, the engine output shaft 220 can be increased in its rotations. Further, the speed of the hydraulic pump 110 of the present invention and the geometry of the displacement chamber of the hydraulic pump 110 of the present invention can be changed to alter the output of the hydraulic pump 110. Further yet, the gearbox 310 of the present invention can be changed to comprise any set of intermeshing gears, coaxially and radially aligned, to provide a desired input-to-output ratio. It will be appreciated that the gearbox 310 may be adapted for selectively operating at one of a plurality of optional ratios or may be adapted for having a variable ratio (e.g., similar to a continuously variable transmission or CVT). Finally, the air compressor 120 can be changed or altered to provide the desired airflow for purposes of recharging the subject railcar air-brake system 130.

The present invention increases the capacity of known road-rail vehicles, including rail-capable material handlers, to transport railcars and rolling stock. Specifically, a rail-capable material handler comprising a preferred embodiment of the present invention, as described herein, is capable of transporting at least six railcars comprised in two different railcar groupings, with one grouping coupled with a train knuckle located at the front end of the road-rail vehicle and the other grouping coupled with a train knuckle located at the rear end of the road-rail vehicle. The road-rail vehicle being capable of properly recharging the air-brake system or systems associated therewith in approximately two minutes or less. Further, the present invention does not significant diminish the utility of the rail-capable material handler. In fact, the present invention greatly increases the utility of the rail-capable material handler for the reasons stated herein. Therefore, the present invention constitutes a solution to a long-felt but unsolved need in addition to providing certain unexpected results.

Figure 14:
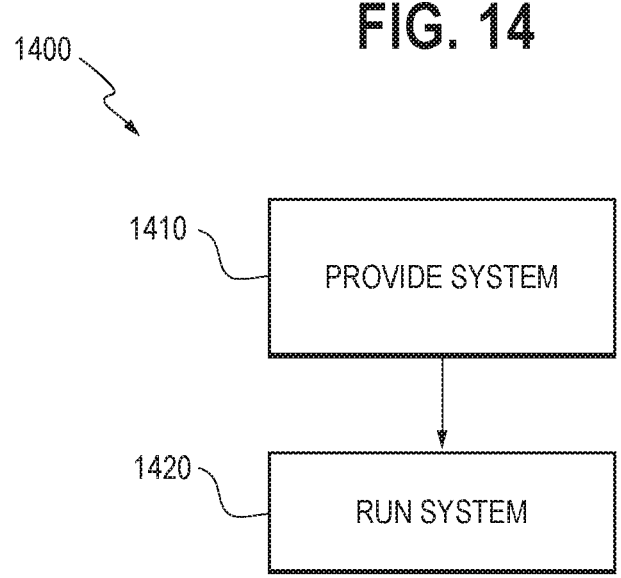
FIG. 14 is a flow diagram of an example method of using a system according to one embodiment of the present invention.

The present invention is further directed to a method of using a system 100 for recharging a railcar air-brake system for a road-rail vehicle 400. FIG. 14 is a diagram depicting an example method 1400 for running the system 100, which may be carried out in accordance with one embodiment of the present invention. As indicated in block 1410, a system 100 can be provided. The system 100 can generally comprise a hydraulic pump 110, an air compressor 120, and at least one railcar air-brake system 130. The air compressor 120 may be operably coupled with and driven by the hydraulic pump 110, and may further be operably coupled with the at least one railcar air-brake system 130. In another embodiment, the system 100 may further comprise an engine output shaft 220, and the hydraulic pump 110 may be operably coupled with and driven by the engine output shaft 220. In yet another embodiment, the system 100 may further comprise a gearbox 310. The gearbox 310 may be operably coupled with and driven by the engine output shaft 220, and the hydraulic pump 110 may be operably coupled with and driven by the gearbox 310. As indicated in block 1420, the system 100 can be run to charge the at least one railcar air-brake system 130.

Figure 15:
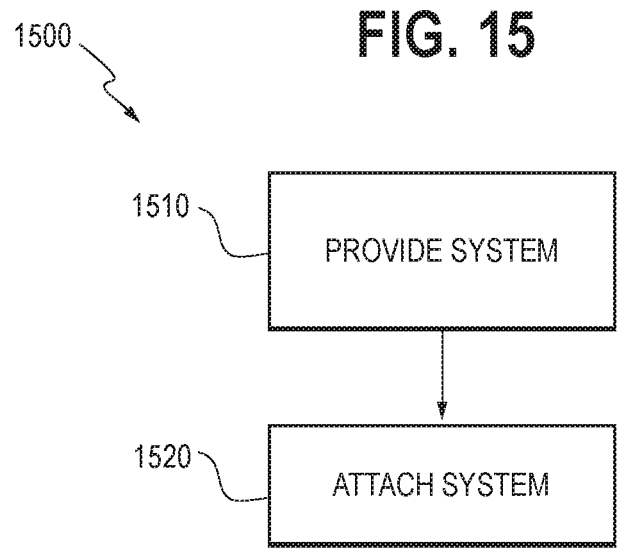
FIG. 15 is a flow diagram of an example method for making a road-rail vehicle with a system according to one embodiment of the present invention.

The present invention is further directed to a method for making a road-rail vehicle 400 with a system 100. FIG. 15 is a diagram depicting an example method 1500 for running the system 100, which may be carried out in accordance with one embodiment of the present invention. As indicated in block 1510, a system 100 can be provided. The system 100 can generally comprise a hydraulic pump 110 and an air compressor 120. The air compressor 120 may be operably coupled with and driven by the hydraulic pump 110, and may further be operably coupled with at least one railcar air-brake system 130.

In another embodiment, the method can further comprise the step of operably coupling the hydraulic pump 110 with an engine output shaft 220, wherein the hydraulic pump 110 may be driven by the engine output shaft 220. In yet another embodiment, the method can further comprise the step of operably coupling the engine output shaft 220 with a gearbox 310, wherein the gearbox 310 may be driven by the engine output shaft 220. In even yet another embodiment, the method can further comprise the step of operably coupling the hydraulic pump 110 with the gearbox 310, wherein the hydraulic pump 110 may be driven by the gearbox 310.

As indicated in block 1520, the system can be attached to or installed on a road-rail vehicle 400. The road-rail vehicle 400 can generally comprise a front end 410, a rear end 420, and at least one train knuckle 430. In one embodiment, the gearbox 310 can be located generally near the front end 410. However, it will be understood that the gearbox 310 can be located rearward of the engine 210 and generally near a cab 460 road-rail vehicle 400. In another embodiment, the engine output shaft 220 can generally extend rearwardly toward the rear end 420 of the road-rail vehicle 400. However, it will be understood that the engine output shaft 220 can generally extend toward the front end 410 or to a forward portion or the forward most portion of the road-rail vehicle 400. In yet another embodiment, the train knuckle 430 can be located proximate the front end 410 of the road-rail vehicle 400.

In one embodiment, the method can further comprise the step of installing the at least one railcar air-brake system.

From the accompanying materials, it will be seen that the invention is one well adapted to attain all the ends and objects set forth herein with other advantages which are obvious and which are inherent to the structure. It will be understood that certain features and subcombinations are of utility and may be employed without reference to other features and subcombinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described in the accompanying materials and illustrated in the drawings are presented by way of example only and are not intended to limit the concepts and principles of the present invention. Thus, there has been shown and described several embodiments of a novel invention. As is evident from the description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for a road-rail vehicle, the system comprising:
   a hydraulic pump;
   an air compressor; and
   at least one railcar air-brake system;
   wherein the road-rail vehicle comprises a front end, a rear end, and an engine for propelling the road-rail vehicle;
   wherein the hydraulic pump is configured for being located in front of the road-rail vehicle engine;
   wherein the air compressor is operably coupled with and driven by the hydraulic pump;
   wherein the air compressor is operably coupled with the at least one railcar air-brake system.

2. The system of claim 1 further comprising an engine output shaft, wherein the hydraulic pump is operably coupled with and driven by the engine output shaft.

3. The system of claim 2 further comprising a gearbox, wherein:
   the gearbox is operably coupled with and driven by the engine output shaft; and
   the hydraulic pump is operably coupled with and driven by the gearbox.

4. The system of claim 1 further comprising:
   a road-rail vehicle comprising a front end, a rear end, and at least one train knuckle; and
   an engine output shaft;
   wherein the hydraulic pump is operably coupled with and driven by the engine output shaft.

5. The system of claim 4, wherein the engine output shaft generally extends rearwardly toward the rear end of the road-rail vehicle.

6. The system of claim 1, wherein the hydraulic pump is a variable displacement hydraulic pump.

7. The system of claim 1 further comprising a remote diagnostic tool.

8. A road-rail vehicle comprising:
   a front end, a rear end, an engine for propelling the road-rail vehicle, and at least one train knuckle; and
   a system comprising:
      a hydraulic pump; and
      an air compressor;
      wherein the hydraulic pump is located proximate the front end of the road-rail vehicle and is located in front of the road-rail vehicle engine;
      wherein the air compressor is operably coupled with and driven by the hydraulic pump;
      wherein the air compressor is adapted to be operably coupled with at least one railcar air-brake system.

9. The road-rail vehicle of claim 8 further comprising an engine output shaft, wherein the hydraulic pump is operably coupled with and driven by the engine output shaft.

10. The road-rail vehicle of claim 9, wherein the engine output shaft generally extends rearwardly toward the rear end of the road-rail vehicle.

11. The road-rail vehicle of claim 10, wherein the at least one train knuckle is located proximate the front end of the road-rail vehicle.

12. The road-rail vehicle of claim 9 further comprising a gearbox, wherein:
   the gearbox is located proximate the front end of the road-rail vehicle and is located in front of the road-rail vehicle engine;
   the gearbox is operably coupled with and driven by the engine output shaft; and
   the hydraulic pump is operably coupled with and driven by the gearbox.

13. The road-rail vehicle of claim 8 further comprising a remote drive tool.

14. The road-rail vehicle of claim 8, wherein the hydraulic pump is coupled with and driven by the engine of the road-rail vehicle.

15. The road-rail vehicle of claim 12, wherein the gearbox is located between the road-rail vehicle engine and the hydraulic pump.

16. A method for making a road-rail vehicle, comprising the steps of:
   providing a system comprising:
      a hydraulic pump; and
      an air compressor;
      wherein the air compressor is operably coupled with and driven by the hydraulic pump;
      wherein the air compressor is adapted to be operably coupled with at least one railcar air-brake system;
   attaching the system to a road-rail vehicle;
      wherein the road-rail vehicle comprises a front end, a rear end, an engine for propelling the road-rail vehicle, and at least one train knuckle;
      wherein the hydraulic pump is located proximate the front end of the road-rail vehicle and is located in front of the road-rail vehicle engine.

17. The method of claim 16 further comprising the step of operably coupling the hydraulic pump with an engine output shaft, wherein the hydraulic pump is driven by the engine output shaft.

18. The method of claim 17 further comprising the steps of:
   operably coupling the engine output shaft with a gearbox; and
   operably coupling the hydraulic pump with the gearbox;
   wherein the gearbox is driven by the engine output shaft;
   wherein the hydraulic pump is driven by the gearbox.

19. The method of claim 18, wherein the gearbox is located proximate the front end of the road-rail vehicle and is located in front of the road-rail vehicle engine.

20. The method of claim 19, wherein the engine output shaft generally extends rearwardly toward the rear end of the road-rail vehicle.

21. The method of claim 20, wherein the at least one train knuckle is located on the front end of the road-rail vehicle.

22. The method of claim 16 further comprising the step of installing the at least one railcar air-brake system.

23. The method of claim 16, wherein the hydraulic pump is coupled with and driven by the engine of the road-rail vehicle.

24. The method of claim 19, wherein the gearbox is located between the road-rail vehicle engine and the hydraulic pump.

25. A road-rail vehicle comprising:
   a front end, a rear end, and an engine for propelling the road-rail vehicle; and
   a system comprising:
      a gearbox; and
      an air compressor;
   wherein the gearbox is located proximate the front end of the road-rail vehicle and is located in front of the road-rail vehicle engine;
   wherein the air compressor is operably coupled with and driven by the gearbox;
   wherein the air compressor is adapted to be operably coupled with at least one railcar air-brake system.

26. The road-rail vehicle of claim 25 further comprising a hydraulic pump, wherein:
   the hydraulic pump is located proximate the front end of the road-rail vehicle and is located in front of the road-rail vehicle engine;
   the gearbox is located between the road-rail vehicle engine and the hydraulic pump; and
   the air compressor is operably coupled with and driven by the gearbox via the hydraulic pump.

* * * * *